Oct. 30, 1962     C. H. BRADBURY ETAL     3,061,105
FILTERS
Filed April 8, 1960     3 Sheets-Sheet 1
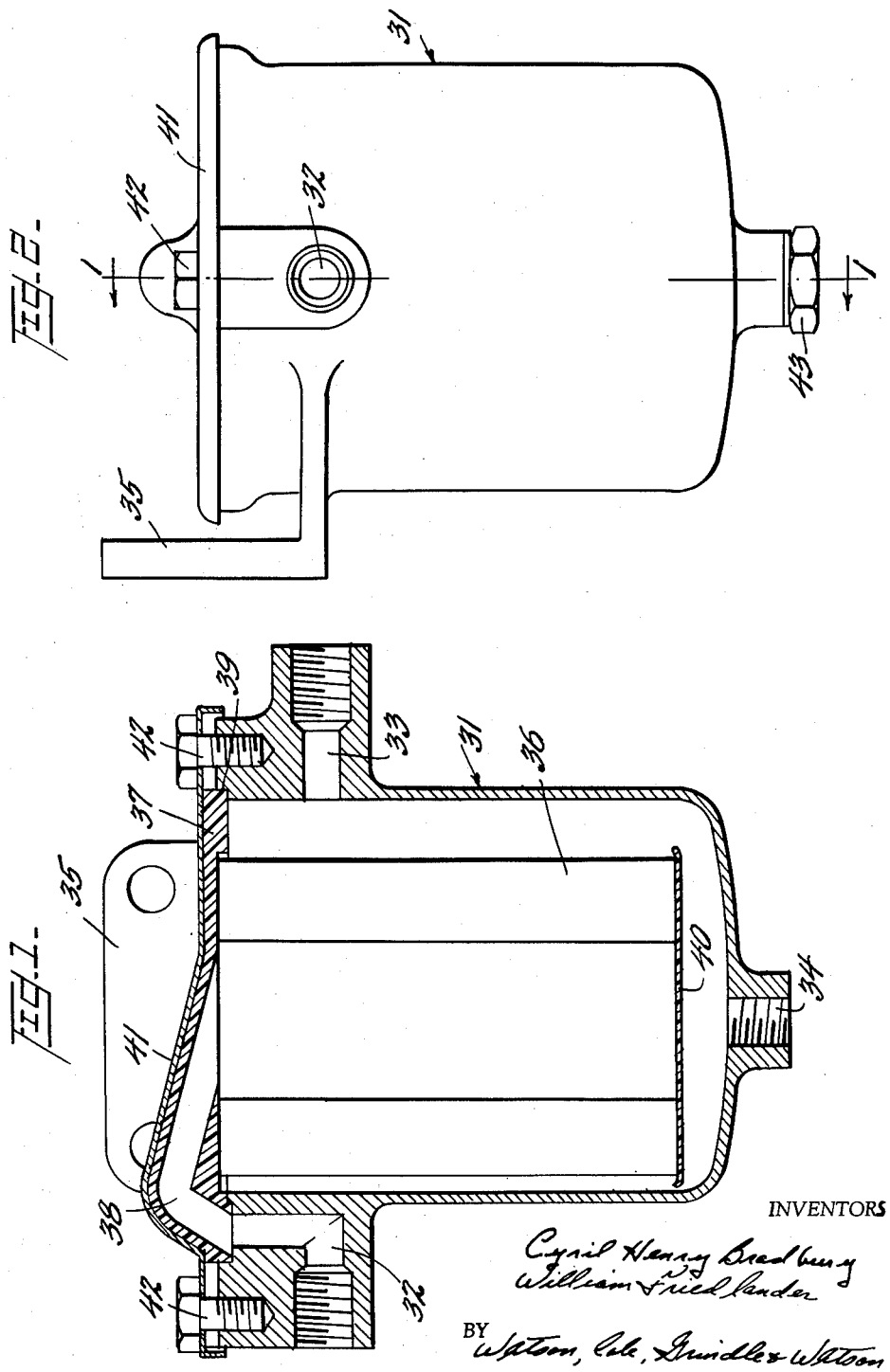
INVENTORS
Cyril Henry Bradbury
William Friedlander
BY Watson, Cole, Grindle & Watson
ATTORNEYS

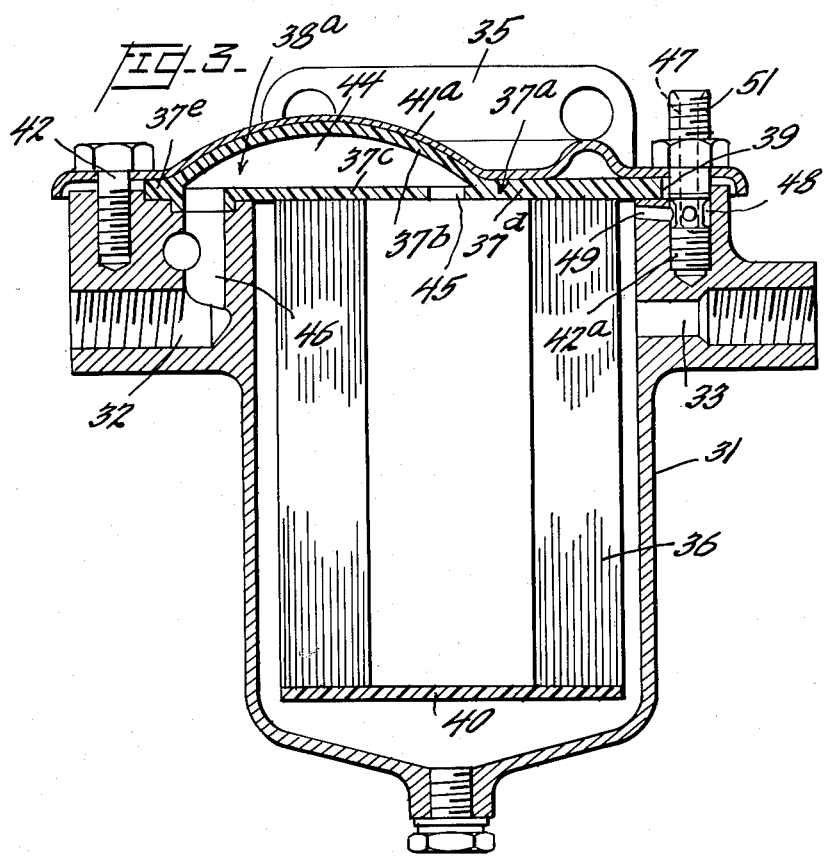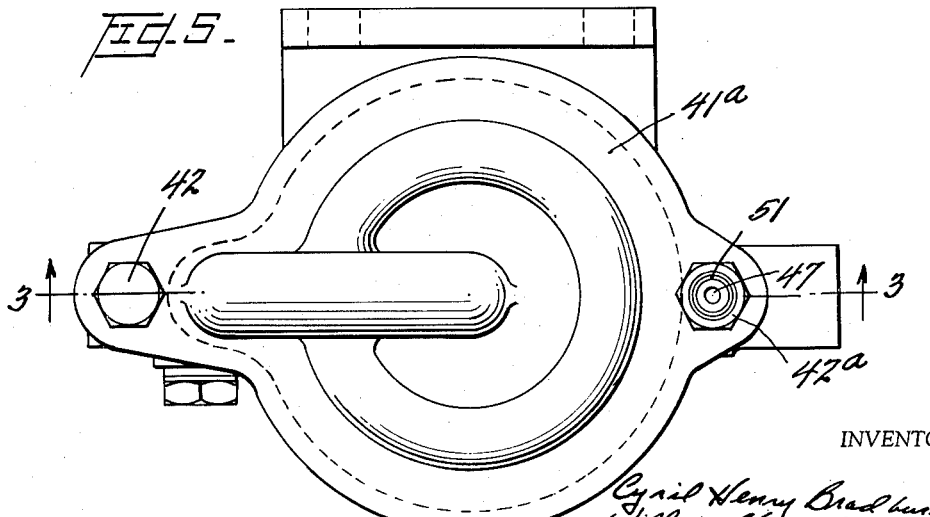

Oct. 30, 1962 C. H. BRADBURY ETAL 3,061,105
FILTERS
Filed April 8, 1960 3 Sheets-Sheet 3
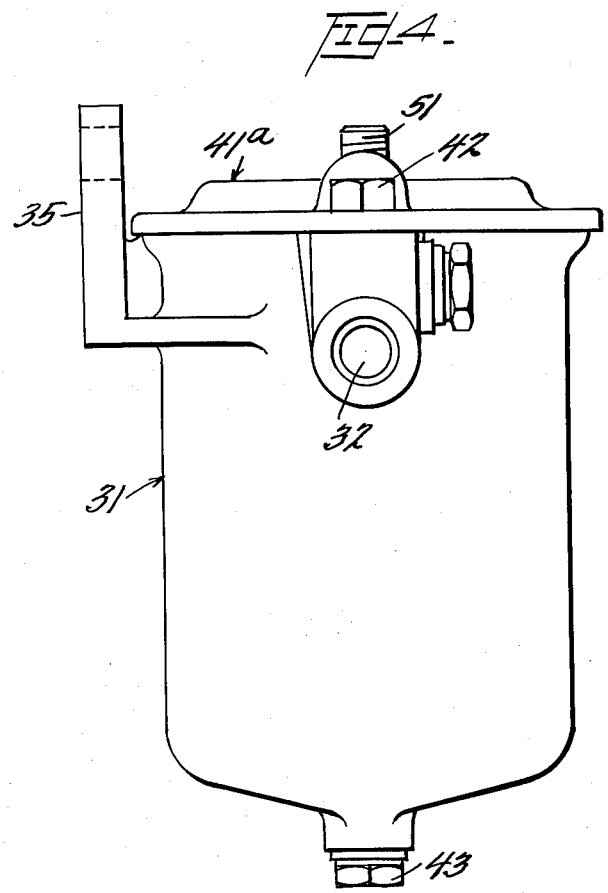
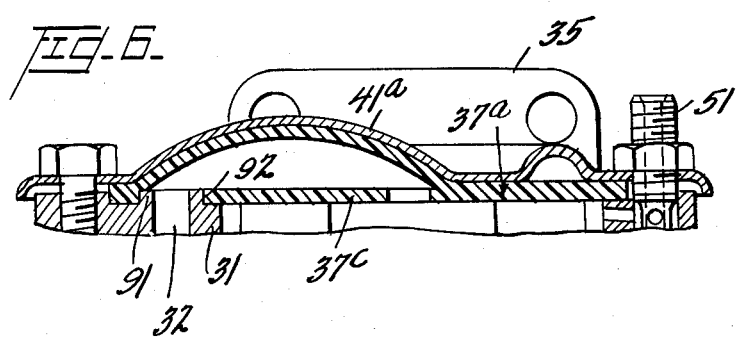
INVENTORS
Cyril Henry Bradbury
William Friedlander
BY
Watson, Cole, Grindle & Watson
ATTORNEYS United States Patent Office 3,061,105
Patented Oct. 30, 1962

3,061,105
FILTERS
Cyril Henry Bradbury and William Friedlander, East Finchley, London, England, assignors to Simms Motor Units Limited, London, England, a British company
Filed Apr. 8, 1960, Ser. No. 21,012
Claims priority, application Great Britain Nov. 6, 1959
2 Claims. (Cl. 210—232)

The invention relates to filters and is more particularly, but not exclusively, concerned with oil filters e.g. for internal combustion engines.

The invention provides a removable and replaceable unit for a filter, which unit comprises a filter element secured to one side of a support member adapted to co-operate with a container, through which support member passes a conduit or opening having a mouth on the said side of the support member, which mouth is adapted for co-operation with a conduit or opening carried by the container to provide at least part of an inlet or outlet passage for the filter.

Preferably the filter element is of hollow formation and the said conduit or opening in the support member communicates with the interior of the filter element. Preferably the support member is formed with a conduit which communicates at one end with the interior of the filter element and is adapted for communication at its other end with the said conduit or opening carried by the container. The support member may be formed from two sheet members bonded together to leave a space between them which space communicates only with two openings formed through one of the sheet members, and which space and openings provide the aforesaid conduit of the support member.

The invention includes a filter comprising, in combination, a container having at least one conduit or opening, and a unit as aforesaid. Preferably the support member interfits with the container and is supported thereby. Preferably the support member is clamped between the container and a cover therefor.

Some specific constructions of oil filters, and replacement units therefor, embodying the invention will now be described by way of example and with reference to the accompanying drawings, in which:

FIGURE 1 is a vertical sectional view of a filter, taken on the line 1—1 in FIGURE 2, FIGURE 2 is a side view of that filter, FIGURE 3 is a vertical sectional view of another filter, taken on the line 3—3 of FIGURE 5, FIGURE 4 is a side view of that filter, FIGURE 5 is a top view of that filter, FIGURE 6 shows a modification which may be made to the filter shown in FIGURES 3–5.

In the example shown in FIGURES 1 and 2 the container 31 has an open top and is formed with conduits 32, 33, 34 and with a mounting lug 35. The filter element or medium 36, which is of paper, is moulded into a support member, or top member, 37 and a bottom member 40 of plastic material. The support member 37 is formed with a conduit 38 which co-operates with the conduit 32 to provide an outlet passage from the filter. The support member 37 fits within an annular recess 39 formed at the mouth of the container and is secured in position by a metal cap 41 which is shaped to conform closely to the upper face of the top of the support member 37 and is secured to the container by screws 42.

The support member 37 also acts as a seal, preventing leakage of oil from the container and also separating the clean filtered oil from the incoming oil.

In use the filter is connected into the fuel or lubricating oil system of an internal combustion engine by means of pipes connected to the conduits 32, 33 so that the conduit 33 serves as the inlet to the filter and the oil leaves the filter through the conduits 38 and 32, after passing through the filter element 36. The conduit 34 is normally closed by a cap screw 43 (shown in FIGURE 2) which may be removed to drain and clean the container when necessary.

The filter element 36 and the member 37 may be readily removed as a unit by first removing the screws 42 and the plate 41 and then merely lifting the filter element 36 and the member 37 as a unit from the container. When the filter element 36 has reached the end of its useful life it may be replaced by inserting a new unit 36, 37 in place of the unit which has been removed from the filter. The "clean" side of the filter element is protected from contamination whilst the unit is being changed and handled.

In this example, the material of which the support member 37 and the bottom member 40 are made is polyvinylchloride together with one or more plasticisers and other additives, the material being oil-resistant.

The filter shown in FIGURES 3–5 is a modification of that which is shown in FIGURES 1 and 2. The support member 37a is made up from two pieces 37b, 37c of oil-resistant polyvinylchloride sheet material which are bonded together at the portions 37d, 37e where they are in contact, leaving a space 44 which, together with openings 45, 46 formed through the member 37e, provide the conduit 38a.

The screw 42a is formed with a bore 47 communicating with an annular groove 48 which in turn communicates with a bore 49 leading to the interior of the container 31. The screw 42 has an upward externally threaded extension 51 so that a bleed connection may be attached to it, for example, to prevent accumulation of air in the filter. When the bleed connection is not required the upper end of the bore 47 may be sealed by a cap nut screwed on to the extension 51.

In the modified construction shown in FIGURE 6, an upstanding boss 91 surrounds the upper end of the conduit 32 and is an interference fit in an opening 92 provided in the member 37c, thereby improving the location of the support member 37a on the container 31 and the seal between them.

The invention is not restricted to the details of the foregoing examples. For instance the support member 37 may alternatively be of a suitable rubber or like material. The member 37 could alternatively be in the form of a substantially flat disc having two separate openings through it to co-operate respectively with the central aperture of the filter element and the conduit 32, an oil connection between these openings being provided by the raised portion of the cap 41. Toggle catches (e.g. somewhat similar to those which are sometimes employed on suit-cases) may be employed, instead of the screws 42, to secure the plate 41 to the container. The container may be made of transparent plastic.

We claim:

1. A filter structure comprising a container having a hollow interior opening through an upwardly directed mouth, said container having a radial projection to one side of said mouth, said projection being formed with a fluid discharge conduit having one end opening upwardly adjacent and to one side of said mouth, a cap secured to said container, said cap completely spanning and overlying both said mouth and said conduit upper end, a unitary supporting and sealing member clamped between said container and said cap over and in sealing relation with and completely closing both the container mouth and said upper end of the conduit, and maintaining said cap out of communication with the container mouth, a hollow filter element secured to the underside of said member and depending therefrom through the container mouth into the hollow interior of the container, said member being formed with a conduit therein extending outwardly between the container and cap and having downwardly directed ends respectively in registering communication with said upper end of the first mentioned conduit, and with the interior of said hollow filter element, said member having a portion between said ends in sealing abutment with the container between the mouth thereof and the discharge conduit, and with the upper end of said filter element to separate the hollow interior of the filter element from the upper end of the discharge conduit.

2. The filter structure of claim 1 in which said hollow filter element is permanently secured to said member, and said member is formed of oil resistant polyvinyl chloride.

References Cited in the file of this patent

UNITED STATES PATENTS

| 2,028,061 | Goldman | Jan. 14, 1936 |
| 2,083,005 | Czarnecki | June 8, 1937 |